United States Patent
Beloussov et al.

(10) Patent No.: US 10,387,666 B2
(45) Date of Patent: Aug. 20, 2019

(54) SYSTEM AND METHOD FOR SYNCHRONIZATION OF LARGE AMOUNTS OF DATA WHILE MAINTAINING CONTROL OVER ACCESS RIGHTS TO SUCH DATA

(71) Applicant: Acronis International GmbH, Schaffhausen (CH)

(72) Inventors: Serguei Beloussov, Costa del Sol (SG); Alexander Tormasov, Moscow (RU); Stanislav Protasov, Moscow (RU); Mark Shmulevich, Moscow (RU)

(73) Assignee: Acronis International GmbH, Shaffhausen (CH)

( * ) Notice: Subject to any disclaimer, the term of this patent is extended or adjusted under 35 U.S.C. 154(b) by 256 days.

(21) Appl. No.: 15/383,315

(22) Filed: Dec. 19, 2016

(65) Prior Publication Data
US 2017/0206368 A1    Jul. 20, 2017

Related U.S. Application Data

(60) Provisional application No. 62/279,163, filed on Jan. 15, 2016.

(51) Int. Cl.
| G06F 17/00 | (2019.01) |
| G06F 21/62 | (2013.01) |
| G06F 21/60 | (2013.01) |
| H04L 29/06 | (2006.01) |
| G06F 21/64 | (2013.01) |

(Continued)

(52) U.S. Cl.
CPC ........ *G06F 21/6209* (2013.01); *G06F 16/275* (2019.01); *G06F 16/278* (2019.01); *G06F 21/602* (2013.01); *G06F 21/6218* (2013.01); *G06F 21/64* (2013.01); *H04L 63/10* (2013.01); *H04L 63/0435* (2013.01); *H04L 63/123* (2013.01); *H04L 67/1095* (2013.01)

(58) Field of Classification Search
None
See application file for complete search history.

(56) References Cited

U.S. PATENT DOCUMENTS

| 8,880,811 B2 * | 11/2014 | Sauermann | G06F 15/167 |
| | | | 711/148 |
| 2004/0024625 A1 * | 2/2004 | Cohen | G06Q 10/063 |
| | | | 705/7.11 |

(Continued)

*Primary Examiner* — Hung D Le
(74) *Attorney, Agent, or Firm* — Arent Fox LLP; Michael Fainberg

(57) ABSTRACT

Disclosed are system and method for synchronization of large amounts of data while maintaining control over access rights to such data in electronic data storage. An exemplary method comprises: partitioning a volume of data into a plurality of data blocks; assigning a synchronization status to at least one data block in the plurality of data blocks; determining access rights to the data contained in the at least one data block, based upon at least one of information identifying an owner or administrator associated with the at least one data block, or a set of allowed or prohibited operations that may be performed on the at least one data block; controlling access to the data contained in the at least one data block based upon the determination of access rights; and updating the synchronization status of the at least one data block.

20 Claims, 8 Drawing Sheets

(51) Int. Cl.
  *G06F 16/27* (2019.01)
  *H04L 29/08* (2006.01)

(56) References Cited

U.S. PATENT DOCUMENTS

| | | | | |
|---|---|---|---|---|
| 2004/0111564 | A1* | 6/2004 | Cypher | G06F 12/0813 |
| | | | | 711/141 |
| 2004/0117563 | A1* | 6/2004 | Wu | G06F 9/52 |
| | | | | 711/150 |
| 2005/0289265 | A1* | 12/2005 | Illowsky | G06F 1/3203 |
| | | | | 710/104 |
| 2007/0271450 | A1* | 11/2007 | Doshi | G06F 9/526 |
| | | | | 712/245 |
| 2013/0138608 | A1* | 5/2013 | Smith | G06F 17/30575 |
| | | | | 707/610 |
| 2014/0321436 | A1* | 10/2014 | Kwon | H04L 5/0085 |
| | | | | 370/336 |
| 2015/0339113 | A1* | 11/2015 | Dorman | H04L 63/123 |
| | | | | 717/169 |
| 2015/0347178 | A1* | 12/2015 | Magee | G06F 9/4881 |
| | | | | 718/103 |
| 2015/0347743 | A1* | 12/2015 | Magee | G06F 21/44 |
| | | | | 726/21 |
| 2015/0370827 | A1* | 12/2015 | Parkison | G06F 16/1844 |
| | | | | 707/626 |
| 2016/0269168 | A1* | 9/2016 | Carstens | A47G 29/141 |
| 2017/0063986 | A1* | 3/2017 | Gopal | H04L 67/1095 |

\* cited by examiner

SYSTEM AND METHOD FOR SYNCHRONIZATION OF LARGE AMOUNTS OF DATA WHILE MAINTAINING CONTROL OVER ACCESS RIGHTS TO SUCH DATA

CROSS-REFERENCE TO RELATED APPLICATION

This patent application claims priority to U.S. Provisional Patent Application No. 62/279,163, filed on Jan. 15, 2016, which is hereby incorporated by reference in its entirety.

FIELD OF TECHNOLOGY

The present disclosure generally relates to the field of electronic data storage, and, more specifically, to a system and method for synchronization of large amounts of data while maintaining control over access rights to such data in electronic data storage.

BACKGROUND

As the number of applications and services provided over the Internet and continues to increase, the amount of electronic content, applications and services used by individuals, enterprises, and the like also continues to rise significantly.

In the modern globalized economy, enterprises are becoming increasingly reliant on the use of networked resources and web-based applications, provided through the Internet or through private networks (e.g., corporate intranets). As the number of network-based applications and services continues to increase, the amount of electronic content, applications and services used by individuals, enterprises, and the like also continues to rise significantly. Moreover, management of networked resources and content is made more difficult by the fact that end users (e.g., employees) may be located in tens or hundreds of different locations. Similarly, mid-sized and large enterprises may maintain multiple data centers around the world.

Accordingly, systems have been developed for archiving or synchronizing data between remote locations (e.g., between an end user and a data center or between data centers). However, the costs of data synchronization and distributed storage increase proportionally with the amount of data being stored and the overhead required for transmission. Bandwidth limitations provide an additional physical bottleneck, as infrastructure may not be available to provide rapid transmission of data between locations, such as between geographically distant locations or on a local intranet that simply lacks high-speed transmission capabilities. Similarly, unreliable network connections can disrupt the transmission of large files, necessitating retransmission and a concomitant increase in cost.

In view of these limitations, synchronization of large files or large collections of files (e.g., terabytes of data) can be especially cost prohibitive for organizations and enterprises with a large, distributed network of users and/or resources. In order to address bandwidth limitations, enterprises may opt to maintain multiple copies of the same data, e.g., by caching content locally or using multiple data centers, so that a local or nearby copy is available for end users at various locations. However, the use of such policies creates security concerns, as the likelihood of data being inadvertently or inappropriately accessed internally, or stolen by a third party, increases directly with the number of copies in existence.

As a result, there remains a need to provide a more efficient, secure and cost-saving technique for storing and synchronizing encrypted data content, especially between a large number of users and/or multiple data centers.

SUMMARY

Thus, the present disclosure provides an effective solution for the foregoing problems by using encrypted data blocks to optimize and secure the transmission, synchronization and storage of electronic data. Disclosed are systems, methods and computer program products for performing the secure transmission, synchronization and storage techniques described herein.

In one exemplary aspect, a method is disclosed for synchronizing encrypted electronic data. According to the aspect, the method includes partitioning, by a processor, a volume of data into a plurality of data blocks; assigning, by the processor, a synchronization status to at least one data block in the plurality of data blocks; determining, by the processor, access rights to the data contained in the at least one data block, based upon at least one of information identifying an owner or administrator associated with the at least one data block, or a set of allowed or prohibited operations that may be performed on the at least one data block; controlling, by the processor, access to the data contained in the at least one data block based upon the determination of access rights; updating, by the processor, the synchronization status of the at least one data block; transmitting, by the processor, the at least one data block to an intermediate storage node, wherein the data block is encrypted prior to transmission; and transmitting, the at least one data block from the intermediate storage node to a central data center, optionally through one or more intervening intermediate storage nodes.

In some exemplary aspects, the method further comprises selecting an intermediate storage node for the transmission of the at least one data block based upon at least one of the following: geographic proximity, latency, available bandwidth, user input, or a priority list.

In some exemplary aspects, the synchronization status indicates at least one of the following: whether a data block is accessible for revision, ready to be archived, an archival copy, or in transit.

In some exemplary aspects, data blocks generated by the partitioning step which contain the same file, or the same portion thereof, are identifiable by a unique identifier.

In some exemplary aspects, the unique identifier is stored in a header included in the at least one data block and comprises at least one of a serial number, a digital signature or a hash value.

In some exemplary aspects, the method further comprises determining whether the contents of the at least one data block have changed prior to transmitting the at least one data block to the intermediate storage node, and only proceeding to the transmitting step if a change is identified.

In some exemplary aspects, determining whether the contents of the at least one data block have changed comprises comparing the unique identifier assigned to the at least one data block to a unique identifier assigned to a second data block stored at the intermediate storage node or the central data center.

In some exemplary aspects, the partitioning, assigning, and controlling, steps are performed by a device or a data center connected to the same intranet as the central data center.

In another exemplary aspect, a system for synchronizing encrypted electronic data is disclosed, the system comprising: an electronic memory; and a processor configured to: partition a volume of data into a plurality of data blocks; assign a synchronization status to at least one data block in the plurality of data blocks; determine access rights to the data contained in the at least one data block, based upon at least one of information identifying an owner or administrator associated with the at least one data block, or a set of allowed or prohibited operations that may be performed on the at least one data block; control access to the data contained in the at least one data block based upon the determination of access rights; update the synchronization status of the at least one data block; and transmit the at least one data block to an intermediate storage node, wherein the data block is encrypted prior to transmission; and the intermediate storage node is configured to: transmit the at least one data block from the intermediate storage node to a central data center, optionally through one or more intervening intermediate storage nodes.

In some exemplary aspects, the system includes a processor configured to perform any of the methods disclosed herein.

In another exemplary aspect, a non-transitory computer readable medium storing computer executable instructions for synchronizing electronic data is disclosed, where the instructions provide for partitioning, by a processor, a volume of data into a plurality of data blocks; assigning, by the processor, a synchronization status to at least one data block in the plurality of data blocks; determining, by the processor, access rights to the data contained in the at least one data block, based upon at least one of information identifying an owner or administrator associated with the at least one data block, or a set of allowed or prohibited operations that may be performed on the at least one data block; controlling, by the processor, access to the data contained in the at least one data block based upon the determination of access rights; updating, by the processor, the synchronization status of the at least one data block; transmitting, by the processor, the at least one data block to an intermediate storage node, wherein the data block is encrypted prior to transmission; and transmitting, the at least one data block from the intermediate storage node to a central data center, optionally through one or more intervening intermediate storage nodes.

The above simplified summary of an exemplary aspect serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more exemplary aspects of the present disclosure and, together with the detailed description, serve to explain their principles and implementations.

DETAILED DESCRIPTION

Figure 1:
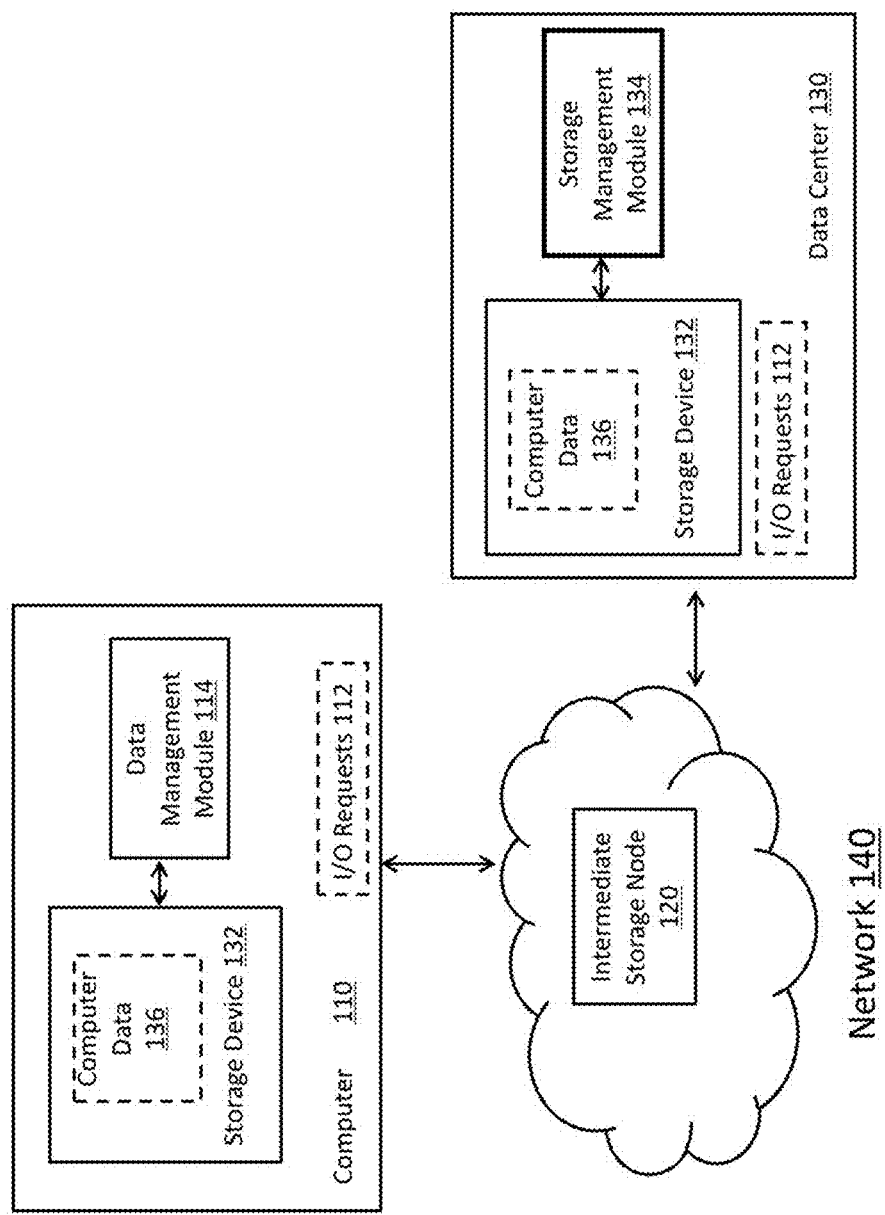
FIG. 1 illustrates a block diagram of a system for synchronizing encrypted electronic data according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a method and system is disclosed for synchronizing encrypted electronic data, such as between a local desktop computer and a remote data center, or between two data centers. As will be appreciated herein, the method and system provides an efficient mechanism for securely transmitting and synchronizing electronic data between devices at multiple locations, which can allow individuals and enterprises to reduce, at least to some extent, data transmission costs and potential security concerns.

In general, mid-sized to large companies and organizations maintain network infrastructure to provide users with Internet access and/or with access to a local intranet. An intranet can be structured as a physically isolated local network, or logically, using encrypted communication channels (e.g. a VPN connection) that are connected via the Internet. Large companies and organizations also typically maintain network-accessible data storage facilities (e.g., data centers) that can receive and archive data transmitted from remote users. Data centers may also synchronize data with end users, ensuring for example, that users receive the most recent version of a given file or other electronic data.

In view of the existing infrastructure described above, FIG. 1 illustrates a block diagram of a system 100 for synchronizing encrypted electronic data according to an exemplary aspect. As will be described in detail below, the system and method disclosed herein uses encrypted data blocks to securely and efficiently transfer and synchronize electronic data.

As generally shown, the system 100 includes a computer 110, at least one intermediate storage node 120, a remote data center 130, and a network 140. It is contemplated that at least one intermediate storage node 120 is located within the network 140 at an intervening point between the computer 110 and the remote data center 130; however, in some aspects, there may be multiple intermediate storage nodes connected between the computer 110 and the remote data center 130. The remote data center 130 can generally include hardware and software components configured to manage various storage resources within the computing environment. For example, the remote data center 130 can include one or more data storage devices 132 (e.g., hard disk drives, optical drives, magnetic tape drives and/or the like) and storage management software (e.g., storage management module 134) that provides an interface to the one or more data storage devices 132. The remote data center 130 facilitates temporary and/or permanent storage of computer data, such as computer data 136. The computer data may be any type of electronic, digital data generated and/or stored by a computer. For example, the computer data 136 can represent text data, executable program code, audio, video or image data, or any other type of digital data. It is contemplated that it some aspects, the computer data is stored in an encrypted form, partitioned as one or more data blocks.

The specific algorithms for encrypting the computer data 136 will be described in detail below, but generally comprise methods known in the art for securely protecting electronic data. Furthermore, the intermediate storage node 120 can be any type of computing device as known to those skilled in the art that is capable of cooperating with the remote data center 130 to execute file system operations on the computer data 136. It should be appreciated that while intermediate storage node 120 and remote data storage 130 are described as forming an online/remote file storage service (e.g., a cloud computing service), these components can be incorporated into a local area network or the like as should be appreciated to those skilled in the art. It is contemplated that in some aspects, the network and hardware resources described above are located within a single intranet.

As further shown, the computer 110 is capable of communicating with the data center via network 140. According to the exemplary aspect, the computer 110 may be any type of computing device, such as a laptop, a desktop, a Personal Digital Assistant (PDA), a tablet, a mobile phone and the like. The specific details of the exemplary computer 110 will be described below with respect to FIG. 8. However, as generally shown in FIG. 1, the computer 110 includes input/output requests 112 as well as multiple software applications, including data management module 114.

According to one aspect, the data management module 114 includes software code (e.g., processor executable instructions) in memory, which may be configured to execute/facilitate the input/output requests 112 into a plurality of file system operations that encrypt/decrypt electronic data to be transmitted and/or synchronized according to the presently disclosed methods and systems. For example, the computer 110 can include a computer-processing unit ("CPU") for executing the data management module 114 to determine one or more file system operations that create and manage computer files of computer data according to an exemplary aspect. It should be appreciated that while the exemplary aspect of FIG. 1 illustrates that computer 110 includes the data management module 114 to create and manage data files as described herein, it is contemplated that data management module 114 can be implemented on intermediate storage node 120 according to an alternative aspect. In addition, while the exemplary algorithm disclosed herein are described as being executed primary by the data management module 114, it is noted that these functions can also be performed by the storage management module 134 located at the remote data storage 130 and/or in performed by a combination of the data management module 114 and the storage management module 134.

Figure 2:
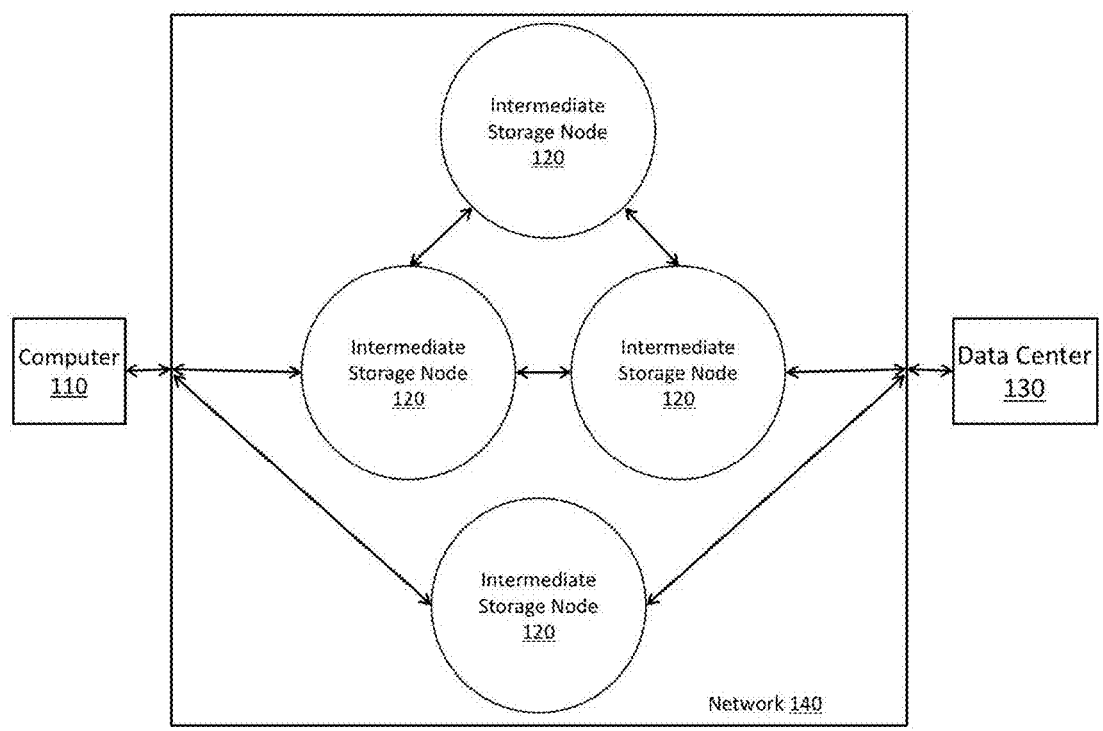
FIG. 2 illustrates a block diagram of a system for synchronizing encrypted electronic data according to a further exemplary aspect.

FIG. 2 illustrates a block diagram of a system 100 for synchronizing encrypted electronic data according to an exemplary aspect. In this case, the depiction of the network 140 is expanded to show three alternative paths that encrypted data blocks may take as they are transmitted between the computer 110 and data center 130. In one path, encrypted data blocks are transmitted through a single intermediate storage node 120 before arriving at the data center 130. In an alternative path, encrypted data blocks travel through two intermediate storage nodes 120 before arriving at the data center 130. In an alternative path, encrypted data blocks travel through three intermediate storage nodes 120 before arriving at the data center 130. It is contemplated that encrypted data blocks may pass through one, two or a plurality of intermediate storage nodes 120 before arriving at the data center 130. In some aspects, encrypted data blocks are directed from the computer 110 to the nearest intermediate storage node 120. In some aspects, when multiple intermediate storage nodes 120 are available, encrypted data blocks are directed from the computer 110 to the intermediate storage node 120 that has the best connection to the computer 110 (e.g., as measured by bandwidth, latency, or packet loss rate).

Figure 3:
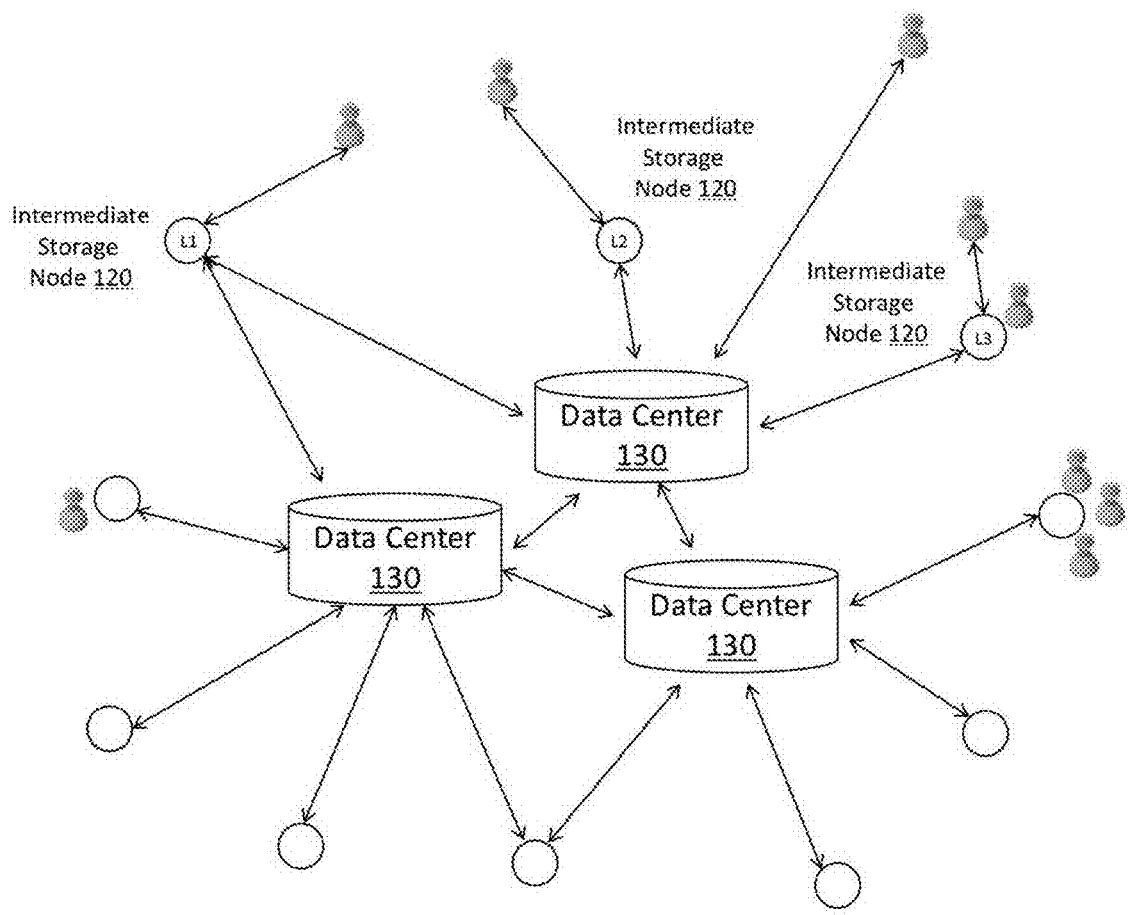
FIG. 3 illustrates a block diagram of a system 100 for synchronizing encrypted electronic data according to a further exemplary aspect.

FIG. 3 illustrates a block diagram of a system 100 for synchronizing encrypted electronic data according to an exemplary aspect. In this case, multiple end users are shown transmitting and receiving electronic data from a computer 110 to various intermediate storage nodes 120 via relatively low-bandwidth wireless channels (e.g., GSM/3G/4G, etc.). As exemplified by this aspect, the network connection between the computer 110, intermediate storage node 120 and data center 130 may be wireless. Moreover, this aspect also shows that each user's computer 110 may be connected to the geographically closest intermediate storage node 120. This design may be preferable in the case of wireless networks, however as discussed above it is contemplated that other criteria may be used to select connections. In the depicted example, each intermediate storage node 120 is shown connecting directly to a data center 130. It is contemplated that the connection between the intermediate storage nodes 120 and data center 130 may be high or low bandwidth connections, though in preferred aspects a high bandwidth connection is available. As shown in this figure, one or more data centers may be connected in order to transfer and/or synchronize encrypted data according to the presently disclosed methods and systems. In network configurations with multiple data centers, a first data center that has received encrypted electronic data in accordance with the present methods may then synchronize itself with one or more other data centers so as to propagate the update throughout the network.

Figure 4:
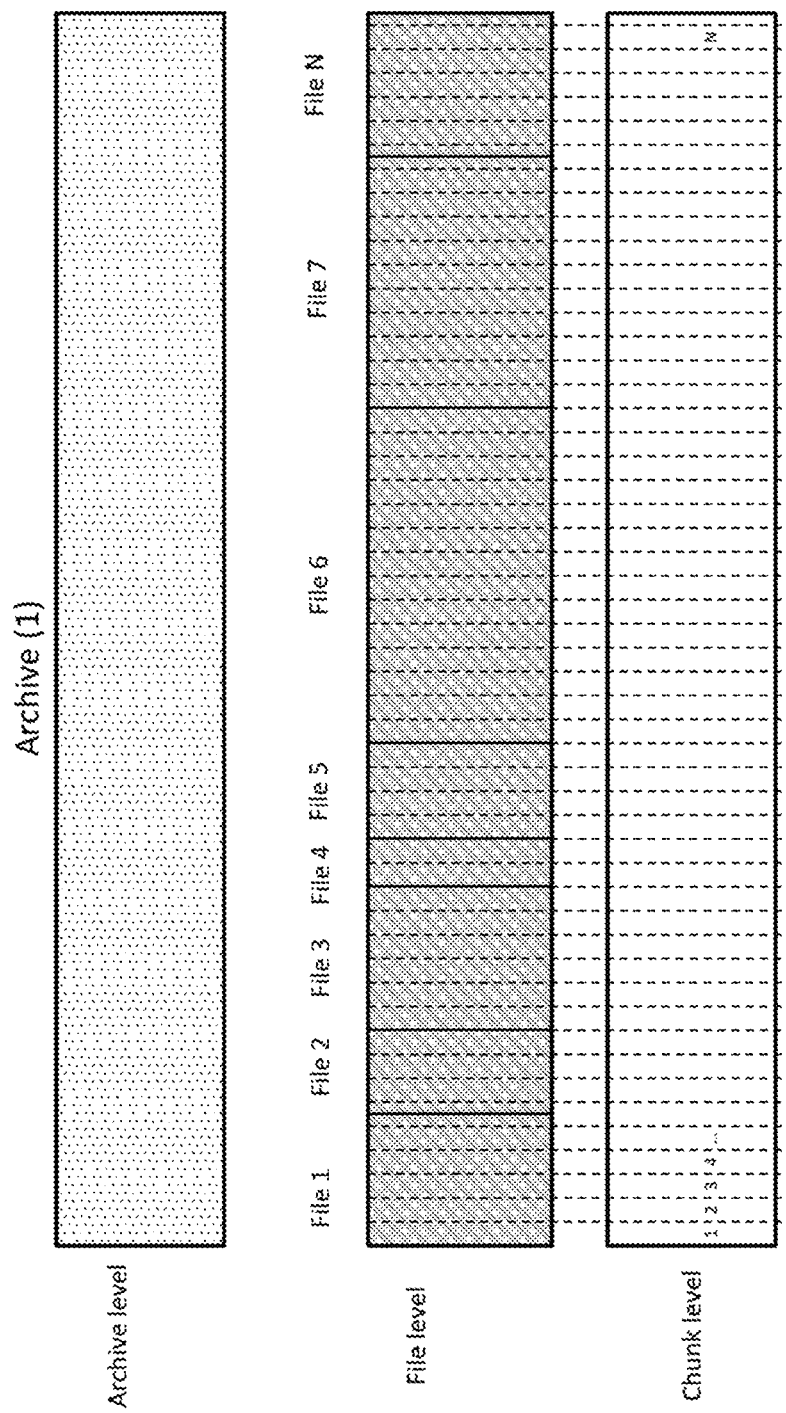
FIG. 4 illustrates a representation of electronic data that may be synchronized according to an exemplary aspect of the system and method described herein.

FIG. 4 illustrates a representation of electronic data that may be synchronized according to an exemplary aspect of the system and method described herein. As shown, electronic data may be in the form of an archive comprising one or more files (e.g., a disk image, a compressed archive, a collection of files stored on a drive). Files may comprise documents, images, databases, or any other file format in which electronic data can be stored. An archive may be partitioned into two or more discrete chunks (e.g., "data blocks") comprising individual files or portions thereof. In the depicted aspect, the data blocks are shown to be of equal size. Data blocks may contain data from a single file (e.g., chunk 1), or from multiple files (e.g., the chunk bridging files 1 and 2). In alternative aspects, data blocks may be of nonequivalent sizes, and/or contain data from two or more noncontiguous files.

In selected aspects, one or more of the data blocks may include information identifying the files (or portions thereof) contained in the one or more data blocks. In an alternative aspect, the information included in a particular data block identifies the files (or portions thereof) contained in a different data block or plurality of data blocks. In selected embodiments, this information may be included in a header section of one or more data blocks. In alternative embodiments, the information may comprise a unique identifier, including but not limited to a unique serial number, digital signature, hash number or label associated with a specific data block or subset of data blocks.

In an alternative aspect, one or more of the data blocks may include information describing the data block partitioning scheme and/or the method of encryption used by the system. In selected aspects, this information is included in a header section of one or more data blocks. In alternative aspects, the data block partitioning scheme and/or the method of encryption is determined by an application that manages the backup process in addition to (or instead of) being described by information stored in one or more of the data blocks.

In a preferred aspect, is contemplated that each data block has a unique identifier associated with it such that any two data blocks containing the same file, or the same portion thereof, are identifiable. For example, in one aspect, two data blocks containing the same file or the same portion thereof, would generate an identical hash value, allowing identification of correspondence between these two data blocks. In another aspect, data blocks may be assigned a unique identifier during the partitioning step that is stored in a file header of the data block, allowing corresponding date blocks to be identified. It is contemplated that the identification of corresponding data blocks improves the efficiency of the disclosed method and system, as it allows the disclosed method and system to operate by only transmitting data blocks that contain data that has been modified or added. After receiving a transmission of data blocks, an archive may then identify correspondence to previously archived data blocks and replace the archived data blocks with the newer versions that have been received. This method obviates the need to transfer complete files or entire archives, reducing bandwidth requirements and transmission time.

As discussed in detail below, data blocks are typically encrypted when in the transit, backup or archive states. Suitable encryption methods include, but are not limited to encryption schemes known in the art (e.g., symmetric, asymmetric, key-based). In selected aspects, the encryption scheme applied may vary for different data blocks. In further aspects, the encryption scheme may be selected based upon criteria including but not limited to the level of importance of secrecy of the data contained in particular data blocks.

Figure 5:
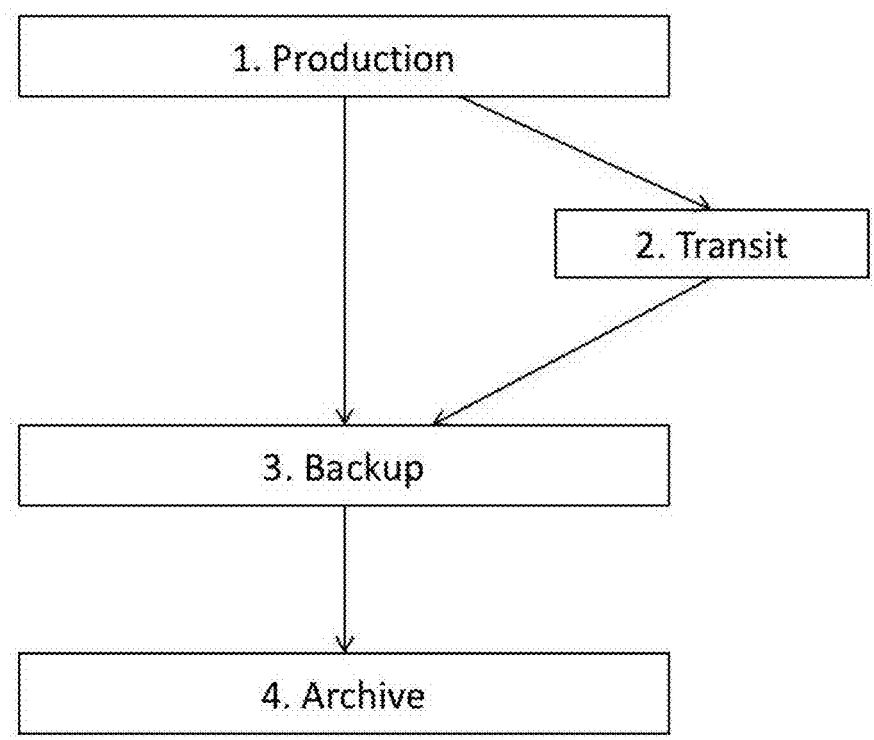
FIG. 5 illustrates a flow chart showing the four states that may be assigned to a data block according to an exemplary aspect of the system and method described herein.

FIG. 5 illustrates a flow chart showing the four states that may be assigned to a data block according to an exemplary aspect of the system and method described herein. Data blocks are assigned the "production" state when any portion of the electronic data stored in the data block can be changed, revised, edited, etc. In this state, the data is unencrypted and can be altered by any user, in accordance with a security policy and/or access rights that may be in effect. In an exemplary aspect, the security policy and/or access rights are controlled by the operating system installed on the computer 110, by an application installed on the operating system, or administered via the network 140. For example, if a file is opened by a user for viewing and/or editing, the one or more data blocks associated with the file would be assigned the production state while the file is open and potentially subject to revisions or editing by the user. Similarly, the production state would be assigned to the one or more data blocks corresponding to a newly-created file.

In selected aspects, while a file is opened by a user for viewing and/or editing, the one or more data blocks associated with that file are assigned with the production state and further assigned as being in a locked state by the system, preventing another user from simultaneously viewing and/or editing the data contained in the data blocks that have been locked. The data blocks may then be set to an unlocked state when the file associated with the one or more data blocks is closed and assigned with the backup state.

In selected embodiments, the system further includes version control functionality such that a file may be accessed and/or edited by multiple users simultaneously, wherein changes to the data blocks associated with the file are saved and assigned a version identifier, such that multiple versions may be assigned the backup state and transmitted to an archive (e.g., a data center) for storage.

When a file comprising production state data blocks is saved or closed by the user, the one or more data blocks associated with that file are assigned to the "backup" state, which identifies the data blocks as containing the latest version of the production, and is ready to be sent to an archive (e.g., a data center). In selected embodiments, when a file is closed all data blocks associated with the file are assigned the backup state. In alternative embodiments, the backup state is only assigned to data blocks which contain data that has been edited or otherwise modified when the data block was in the most recent product state.

Upon assignment with the backup state, it is envisioned that a data block will be selected and prepared for transmission to an archive (e.g., a data center). During transmission, a data block is assigned as in the transit state and remains encrypted. In some aspects, data blocks may be transmitted immediately, though in alternative aspects data blocks may be placed in a queue, buffer or other form of temporary storage prior to transmission, such as cases where the computer is subject to bandwidth limitations. In instances where a plurality of data blocks are selected for transmission, said data blocks may be transmitted according to any reasonable schedule. For example, a plurality of data blocks may be transmitted according to a first-in-first-out (FIFO) or last-in-first-out (LIFO) or other priority scheme. In selected embodiments only data blocks which contain data that has been edited or otherwise modified when the data block was in the most recent product state are transmitted to the archive.

Transit state data blocks received by an archive are reassigned to the archive state and stored in the repository, remaining in an encrypted form. For example, a data block selected for backup and transmitted by a remote user to a corporate data center may be assigned as an archive state data block and stored. It is contemplated that archive state data may be stored as a single copy in an archive in order to minimize storage requirements; however, in alternative aspects one or more additional redundant copies may be maintained by an archive, as in cases where data redundancy is desirable. In cases where multiple redundant copies are stored at one or more archives (e.g., at multiple data centers), it is understood that changes may be synchronized such that all archives maintain a single version of an archived data block. It is further contemplated that in some aspects, alternative versions of a data block may be maintained in an archive, e.g., an archive may store all backup state data blocks transmitted to the archive, such that iterative changes may be preserved and recorded. In such embodiments, archived data blocks may be organized according to a timestamp or other inventory system in order to identify different versions of an archived data block.

Figure 6:
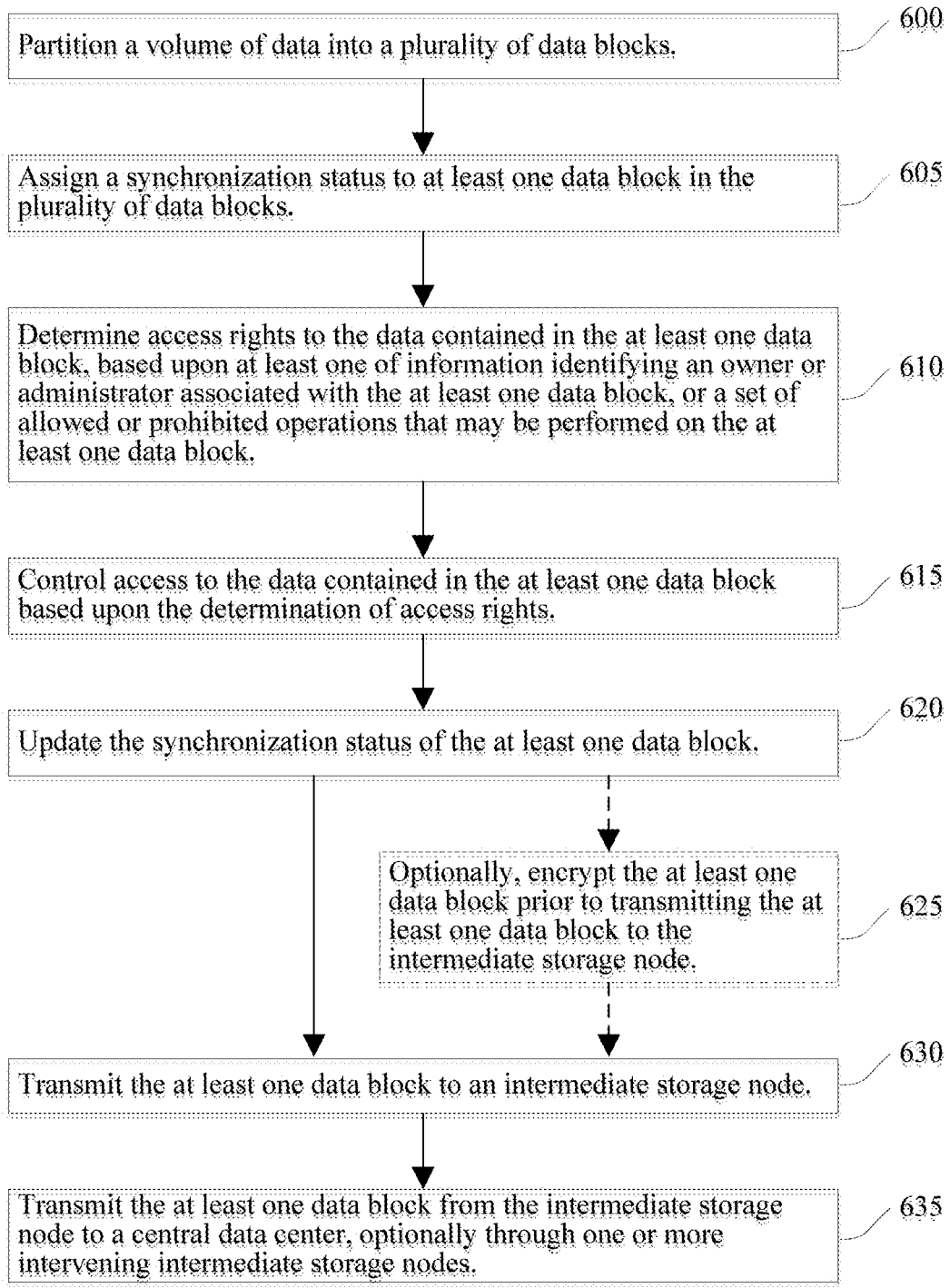
FIG. 6 is a flowchart illustrating an exemplary aspect of a method for synchronizing electronic data according to the present disclosure.

FIG. 6 illustrates a method according to one exemplary aspect of the disclosure. In a first step, a volume of data into a plurality of data blocks (600). Thereafter, at least one data block in the plurality of data blocks may be assigned a synchronization status (605). The synchronization status may contain information describing the archival status of the data block (e.g., indicating whether it is accessible for revisions, ready for archiving, in transit, or an archival copy). The synchronization status may be applied to the data block itself (e.g., as metadata added to the file header) or recorded in a separate file or list. Access rights to the data contained in the at least one data block may then be determined, based upon at least one of information identifying an owner or administrator associated with the at least one data block, or a set of allowed or prohibited operations that may be performed on the at least one data block (610). In other aspects, not shown here, access rights may be determined by other policies or parameters (e.g., temporal access policies, policies applied to a set of users in a particular group or network domain). Access to the data contained in the at least one data block may then be controlled based upon the determination of access rights (615) and the synchronization status of the at least one data block may be updated (620). For example, synchronization status may be updated when a data block is currently being accessed or if the contents of the data block have been modified (e.g., by a user opening and/or editing a file comprising a given data block). The at least one data block may then be transmitted to an intermediate storage node (630). In some aspects, the at least one data block is encrypted prior to transmission (625). Finally, the data block (or encrypted data block) may be transmitted from the intermediate storage node to a central data center, optionally through one or more intervening intermediate storage nodes (635).

The general method of this exemplary aspect may be modified to suit the needs of a given implementation. For example, in some exemplary aspects the data blocks (optionally encrypted) may be transmitted directly to a central data center, omitting the need for one or more intervening intermediate storage nodes. In some exemplary aspects, there may be additional steps incorporated into the method, such as a process for identifying and selecting the intermediate storage node used for the transmission of the data blocks. A plurality of intermediate storage nodes may be available. In some exemplary aspects, an intermediate storage node may be selected based upon one or more parameters such as available bandwidth, latency, geographic proximity, user input, a preference list or file, or encryption standards. In some exemplary aspects, the data block may be transmitted to two or more intermediate storage nodes, in succession or in parallel. In some exemplary aspects, the transmission of data blocks to multiple intermediate storage nodes may proceed in parallel in order to maximize available bandwidth (e.g., a plurality of data blocks that need to be archived may be partitioned into subsets which are then simultaneously transmitted to a plurality of intermediate storage nodes).

Figure 7:
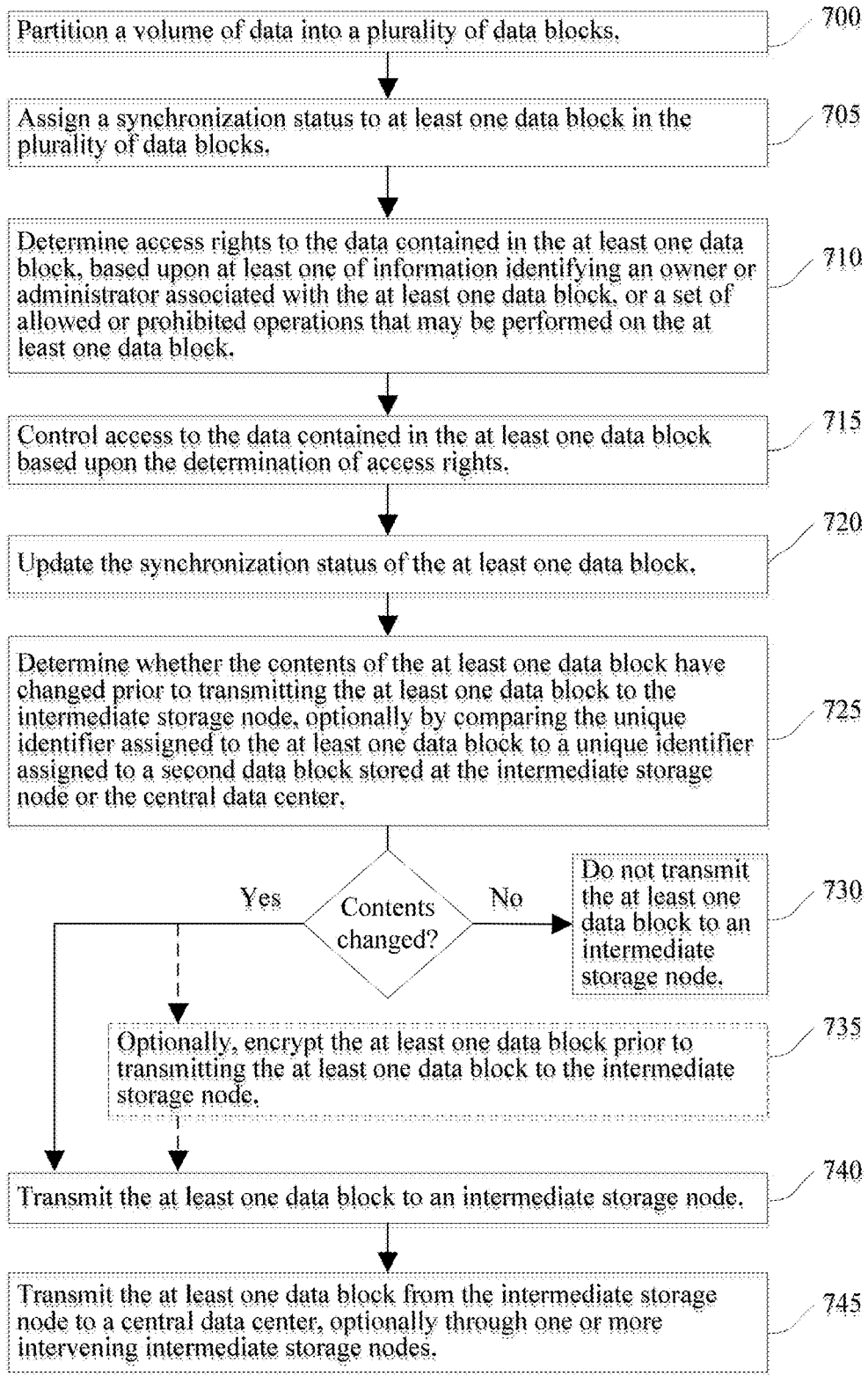
FIG. 7 is a flowchart illustrating a further exemplary aspect of a method for synchronizing electronic data according to the present disclosure.

FIG. 7 illustrates a method according to one exemplary aspect of the disclosure. As indicated above, in some aspects the present disclosure provides methods of synchronizing data which provide increased efficiency by avoiding the archiving of unmodified data. FIG. 7 illustrates one such implementation, similar to that illustrated by FIG. 6, but with an additional step of determining whether the contents of the at least one data block have changed prior to transmitting the at least one data block to the intermediate storage node, optionally by comparing the unique identifier assigned to the at least one data block to a unique identifier assigned to a second data block stored at the intermediate storage node or the central data center (725). In this exemplary aspect, the determination is made by comparing the unique identifier associated with the data block (e.g., a hash value). However, other parameters may be used to determine whether archiving should proceed (e.g., a date created/modified parameter or other metadata). If the determination indicates that the contents of the data block have not changed then the data block is not transmitted to the intermediate storage node (735). Alternatively, if the content has changed then archiving may proceed via the transmission to an intermediate storage node (740) and then to a central data center (745). As indicated above in relation to FIG. 6, the general method of this exemplary aspect may be modified to incorporate the alternative features and configurations described in connection with any other aspect of the present disclosure.

Figure 8:
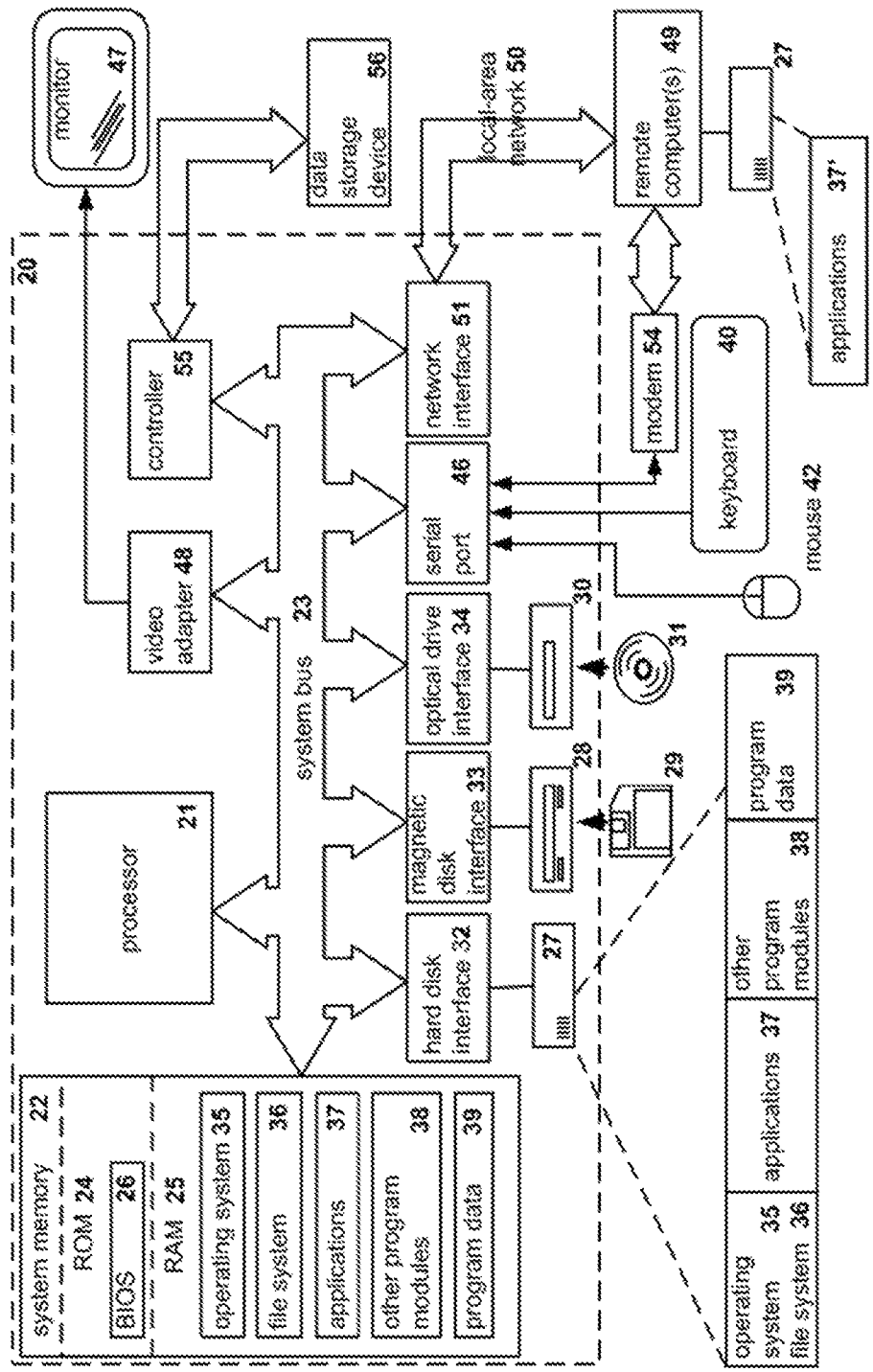
FIG. 8 illustrates an example of a general-purpose computer system on which the disclosed systems and methods (e.g., the exemplary aspects illustrated by FIGS. 6 and 7) can be implemented.

Finally, FIG. 8 illustrates an example of a general-purpose computer system (which may be a personal computer or a server) on which the disclosed systems and method can be implemented according to an example aspect. It should be appreciated that the detailed general-purpose computer system can correspond to the computer 110 described above with respect to FIG. 1. Moreover, the remote computer(s) 49, as described below, can correspond to the remote data storage services discussed above with respect to the exemplary system and method.

As shown in FIG. 8, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted as by one of ordinary skill in the art in light of the teachings and guidance presented herein. Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of synchronizing electronic data, comprising:
partitioning, by a processor, a volume of data into a plurality of data blocks;
assigning, by the processor, a synchronization status to at least one data block of the plurality of data blocks;
determining, by the processor, access rights to the data contained in the at least one data block, based upon at least one of information identifying an owner or administrator associated with the at least one data block, or a set of allowed or prohibited operations that may be performed on the at least one data block;
controlling, by the processor, access to the data contained in the at least one data block based upon the determination of access rights;
updating, by the processor, the synchronization status of the at least one data block;
transmitting, by the processor, the at least one data block to an intermediate storage node, wherein the data block is encrypted prior to transmission; and
transmitting, the at least one data block from the intermediate storage node to a central data center, optionally through one or more intervening intermediate storage nodes.

2. The method of claim 1, further comprising:
selecting an intermediate storage node for the transmission of the at least one data block based upon at least one of the following: geographic proximity, latency, available bandwidth, user input, or a priority list.

3. The method of claim 1, wherein the synchronization status indicates at least one of the following: whether a data block is accessible for revision, ready to be archived, an archival copy, or in transit.

4. The method of claim 1, wherein data blocks generated by the partitioning which contain the same file, or the same portion thereof, are identifiable by a unique identifier.

5. The method of claim 4, wherein the unique identifier is stored in a header included in the at least one data block and comprises at least one of a serial number, a digital signature or a hash value.

6. The method of claim 4, further comprising:
determining whether the contents of the at least one data block have changed prior to transmitting the at least one data block to the intermediate storage node, and only proceeding to the transmitting if a change is identified.

7. The method of claim 6, wherein determining whether the contents of the at least one data block have changed comprises comparing the unique identifier assigned to the at least one data block to a unique identifier assigned to a second data block stored at the intermediate storage node or the central data center.

8. The method of claim 1, wherein the partitioning, assigning, and controlling are performed by a device or a data center connected to the same intranet as the central data center.

9. A system for synchronizing encrypted electronic data, the system comprising:
an electronic memory; and
a processor configured to:
partition a volume of data into a plurality of data blocks;
assign a synchronization status to at least one data block of the plurality of data blocks;
determine access rights to the data contained in the at least one data block, based upon at least one of information identifying an owner or administrator associated with the at least one data block, or a set of allowed or prohibited operations that may be performed on the at least one data block;
control access to the data contained in the at least one data block based upon the determination of access rights;
update the synchronization status of the at least one data block; and
transmit the at least one data block to an intermediate storage node, wherein the data block is encrypted prior to transmission; and
the intermediate storage node is configured to:
transmit the at least one data block from the intermediate storage node to a central data center, optionally through one or more intervening intermediate storage nodes.

10. The system of claim 9, wherein the processor is further configured to:
select an intermediate storage node for the transmission of the at least one data block based upon at least one of the following: geographic proximity, latency, available bandwidth, user input, or a priority list.

11. The system of claim 9, wherein the synchronization status indicates at least one of the following: whether a data block is accessible for revision, ready to be archived, an archival copy, or in transit.

12. The system of claim 9, wherein data blocks generated by the partitioning which contain the same file, or the same portion thereof, are identifiable by a unique identifier.

13. The system of claim 12, wherein the unique identifier is stored in a header included in the at least one data block and comprises at least one of a serial number, a digital signature or a hash value.

14. The system of claim 12, wherein the processor is further configured to:
determine whether the contents of the at least one data block have changed prior to transmitting the at least one data block to the intermediate storage node, and to only transmit the at least one data block to the intermediate storage node if a change is identified.

15. The system of claim 14, wherein the processor is configured to determine whether the contents of the at least one data block have changed by comparing the unique identifier assigned to the at least one data block to a unique identifier assigned to a second data block stored at the intermediate storage node or the central data center.

16. The system of claim 9, wherein the partitioning, assigning, and controlling are performed by a device or a data center connected to the same intranet as the central data center.

17. A non-transitory computer readable medium storing computer executable instructions for synchronizing electronic data, including instructions for:
partitioning, by a processor, a volume of data into a plurality of data blocks;
assigning, by the processor, a synchronization status to at least one data block of the plurality of data blocks;
determining, by the processor, access rights to the data contained in the at least one data block, based upon at least one of information identifying an owner or administrator associated with the at least one data block, or a set of allowed or prohibited operations that may be performed on the at least one data block;
controlling, by the processor, access to the data contained in the at least one data block based upon the determination of access rights;
updating, by the processor, the synchronization status of the at least one data block;
transmitting, by the processor, the at least one data block to an intermediate storage node, wherein the data block is encrypted prior to transmission; and
transmitting, the at least one data block from the intermediate storage node to a central data center, optionally through one or more intervening intermediate storage nodes.

18. The non-transitory computer readable medium of claim 17, further including instructions for:
selecting an intermediate storage node for the transmission of the at least one data block based upon at least one of the following: geographic proximity, latency, available bandwidth, user input, or a priority list.

19. The non-transitory computer readable medium of claim 17, wherein data blocks generated by the partitioning which contain the same file, or the same portion thereof, are identifiable by a unique identifier.

20. The non-transitory computer readable medium of claim 19, further including instructions for:
determining whether the contents of the at least one data block have changed by comparing the unique identifier assigned to the at least one data block to a unique identifier assigned to a second data block stored at the intermediate storage node or the central data center prior to transmitting the at least one data block to the intermediate storage node; and
only proceeding to transmit the at least one data block to the intermediate storage node if a change is identified.

* * * * *